United States Patent
Park (10) Patent No.: US 11,316,589 B2
(45) Date of Patent: Apr. 26, 2022

(54) OPTICAL TRANSCEIVER AND METHOD OF AUTOMATICALLY SETTING WAVELENGTH THEREOF

(71) Applicant: SOLiD, INC., Seongnam-si (KR)

(72) Inventor: Bum Soo Park, Seongnam-si (KR)

(73) Assignee: SOLiD, INC., Seongnam-si (KR)

( * ) Notice: Subject to any disclaimer, the term of this patent is extended or adjusted under 35 U.S.C. 154(b) by 0 days.

(21) Appl. No.: 17/125,183

(22) Filed: Dec. 17, 2020

(65) Prior Publication Data
US 2021/0184773 A1 Jun. 17, 2021

(30) Foreign Application Priority Data

Dec. 17, 2019 (KR) .................. 10-2019-0168808
Dec. 16, 2020 (KR) .................. 10-2020-0176756

(51) Int. Cl.
*H04B 10/00* (2013.01)
*H04B 10/40* (2013.01)
*H04B 10/50* (2013.01)
*H04B 10/572* (2013.01)
*H04J 14/02* (2006.01)

(52) U.S. Cl.
CPC ........... *H04B 10/40* (2013.01); *H04B 10/506* (2013.01); *H04B 10/572* (2013.01); *H04J 14/0201* (2013.01)

(58) Field of Classification Search
CPC .... H04B 10/40; H04B 10/506; H04B 10/572; H04J 14/0201
USPC ....................................................... 398/135
See application file for complete search history.

(56) References Cited

U.S. PATENT DOCUMENTS

| 9,917,671 B2 | 3/2018 | Stracca et al. |
| 10,720,997 B1 | 7/2020 | Shu et al. |
| 2005/0244161 A1* | 11/2005 | Satoh ............... H04J 14/0227 398/85 |
| 2012/0033974 A1 | 2/2012 | Ikai et al. |

FOREIGN PATENT DOCUMENTS

| EP | 3078129 A1 | 10/2016 |
| KR | 10-2017-0115878 A | 10/2017 |
| WO | 2015084871 A1 | 6/2015 |

OTHER PUBLICATIONS

Communication dated May 20, 2021, from the European patent office in application No. 20214982.9.

* cited by examiner

*Primary Examiner* — Mohammad R Sedighian
(74) *Attorney, Agent, or Firm* — Sughrue Mion, PLLC (57) ABSTRACT

Provided is an optical transceiver including: an optical transmitter configured to sequentially generate a plurality of optical transmission signals each including transmission wavelength information and output the plurality of optical transmission signals to a connected multiplexer/demultiplexer; and a controller configured to generate the transmission wavelength information for each of the plurality of optical transmission signals.

11 Claims, 4 Drawing Sheets

OPTICAL TRANSCEIVER AND METHOD OF AUTOMATICALLY SETTING WAVELENGTH THEREOF

CROSS-REFERENCE TO RELATED APPLICATION

This application claims the benefit of Korean Patent Application No. 10-2019-0168808, filed on Dec. 17, 2019, and Korean Patent Application No. 10-2020-0176756, filed on Dec. 16, 2020, in the Korean Intellectual Property Office, the disclosures of which are incorporated herein in its entirety by reference.

BACKGROUND

1. Field

The present disclosure relates to an optical transceiver and a method of automatically setting a wavelength thereof.

2. Description of the Related Art

Wavelength-division multiplexing (WDM) is a technology that may simultaneously transmit multiple optical signals through an identical optical fiber, which is achieved by making each optical signal have a different wavelength. On a transmitting side of a WDM-based optical communication system, various signals of different wavelengths are transmitted on the identical optical fiber. On a receiving side of the WDM-based optical communication system, the wavelengths are often separated. The advantage of a WDM system is that a virtual optical fiber is effectively provided by allowing one optical fiber to carry multiple optical signals having different carrier wavelengths.

In general, optical communication devices on the transmitting and receiving sides constituting the WDM-based optical communication system are located several to tens of kilometers apart from each other. In addition, a plurality of corresponding optical transceivers of both sides are connected to multiplexers/demultiplexers through an optical cable, so that optical signals may be transmitted and received with each other at a remote location. For such optical communication, an optical link needs to be formed by setting wavelengths for transmission and reception of the corresponding optical transceivers on both sides. However, it is very cumbersome and takes a long time for an administrator to visit the installation site of the optical communication devices and set wavelengths of the optical transceivers.

SUMMARY

Provided are an optical transceiver capable of automatically setting a wavelength without an administrator's visit, and a method of automatically setting a wavelength of the optical transceiver.

Additional aspects will be set forth in part in the description which follows and, in part, will be apparent from the description, or may be learned by practice of the presented embodiments.

According to an aspect of the present disclosure, there is provided an optical transceiver includes an optical transmitter configured to sequentially generate a plurality of optical transmission signals each including transmission wavelength information and output the plurality of optical transmission signals to a connected multiplexer/demultiplexer; and a controller configured to generate the transmission wavelength information for each of the plurality of optical transmission signals.

According to an exemplary embodiment, the optical transceiver may generate each of the plurality of optical transmission signals by superposing an optical signal corresponding to the transmission wavelength information and an optical signal having a wavelength indicated by the transmission wavelength information.

According to an exemplary embodiment, the optical signal corresponding to the transmission wavelength information and the optical signal having a wavelength indicated by the transmission wavelength information may be optical signals of different channels.

According to an exemplary embodiment, a channel of the optical signal corresponding to the transmission wavelength information may be an auxiliary management and control channel (AMCC).

According to an exemplary embodiment, any one of the plurality of optical transmission signals may be transmitted to another optical transceiver through the multiplexer/demultiplexer.

According to an exemplary embodiment, the optical transceiver may further include an optical receiver receiving an optical response signal that is transmitted from the other optical transceiver in response to any one of the plurality of optical transmission signals through the multiplexer/demultiplexer and including reception wavelength information and transmission wavelength information, wherein the controller may identify a transmission wavelength and a reception wavelength for communication with the other optical transceiver based on the reception wavelength information and the transmission wavelength information included in the optical response signal.

According to an exemplary embodiment, the controller may generate link information with the other optical transceiver based on the identified transmission wavelength and the reception wavelength, and the optical transmitter may generate an optical signal corresponding to the link information and outputs the generated optical signal to the multiplexer/demultiplexer.

According to an aspect of the present disclosure, there is provided an optical transceiver includes an optical receiver receiving an optical transmission signal that is transmitted from another optical transceiver and including transmission wavelength information through a connected multiplexer/demultiplexer; and a controller configured to identify a reception wavelength for communication with the other optical transceiver based on the transmission to wavelength information included in the optical transmission signal.

According to an exemplary embodiment, the optical transceiver may further include an optical transmitter configured to sequentially generate a plurality of optical response signals each including transmission wavelength information and reception wavelength information about the identified reception wavelength in response to the optical transmission signal and output the plurality of optical response signals to the multiplexer/demultiplexer, wherein the controller may generate the transmission wavelength information and the reception wavelength information for each of the plurality of optical response signals.

According to an exemplary embodiment, the optical transmitter may generate each of the plurality of optical response signals by superposing an optical signal corresponding to the transmission wavelength information and the reception wavelength information and an optical signal having a wavelength indicated by the transmission wavelength information.

According to an exemplary embodiment, the optical signal corresponding to the transmission wavelength information and the reception wavelength information and the optical signal having a wavelength indicated by the transmission wavelength information may be optical signals of different channels.

According to an exemplary embodiment, a channel of the optical signal corresponding to the transmission wavelength information and the reception wavelength information may be an auxiliary management and control channel (AMCC).

According to an exemplary embodiment, any one of the plurality of optical response signals may be transmitted to the other optical transceiver through the multiplexer/demultiplexer.

According to an exemplary embodiment, the optical receiver may receive an optical signal that is transmitted from the other optical transceiver in response to any one of the plurality of optical response signals through the multiplexer/demultiplexer and corresponding to optical link information, and the controller may identify a transmission wavelength for communication with the other optical transceiver based on the link information included in the optical signal.

According to embodiments of the present disclosure, wavelengths of corresponding optical transceivers may be automatically set without an administrator's visit. Accordingly, it is possible to reduce wavelength-related installation and maintenance costs as well as improve convenience.

In addition, because there is no compatibility issue with an optical communication device on which optical transceivers are mounted, and optical transceivers including the same to components may be used at both ends of a link, system construction costs may be reduced.

Effects obtainable by the embodiments of the disclosure are not limited to the effects described above, and other effects not described herein may be clearly understood by one of ordinary skill in the art to which the inventive concept belongs from the following description.

BRIEF DESCRIPTION OF THE DRAWINGS

Embodiments of the disclosure will be more clearly understood from the following detailed description taken in conjunction with the accompanying drawings in which.

DETAILED DESCRIPTION

Since the disclosure may have diverse modified embodiments, preferred embodiments are illustrated in the drawings and are described in the detailed description. However, this is not intended to limit the disclosure to particular modes of practice, and it is to be appreciated that all changes, equivalents, and substitutes that do not depart from the spirit and technical scope of the disclosure are encompassed in the disclosure.

In the description of the disclosure, certain detailed explanations of the related art are omitted when it is deemed that they may unnecessarily obscure the essence of the disclosure. In addition, numeral figures (e.g., first, second, and the like) used during describing the specification are just identification symbols for distinguishing one element from another element.

Further, in the specification, if it is described that one component "is connected to" or "accesses" the other component, it is understood that the one component may be directly connected to or may directly access the other component but unless explicitly described to the contrary, another component may "be connected" or "access" between the components.

In addition, terms including "unit," "er," "or," "module," and the like disclosed in the specification mean a unit that processes at least one function or operation and this may be implemented by hardware or software such as a processor, a micro processor, a micro controller, a central processing unit (CPU), a graphics processing unit (GPU), an accelerated Processing unit (APU), a digital signal processor (DSP), an application specific integrated circuit (ASIC), and a field programmable gate array (FPGA) or a combination of hardware and software.

In addition, it is intended to clarify that the division of the components in the specification is only made for each main function that each component is responsible for. That is, two or more components to be described later below may be combined into one component, or one components may be divided into two or more components according to more subdivided functions. In addition, it goes without saying that each of the components to be described later below may additionally perform some or all of the functions of other components in addition to its own main function, and some of the main functions that each of the components is responsible for may be dedicated and performed by other components.

Hereinafter, various embodiments of the disclosure will be described in detail in order.

Figure 1:
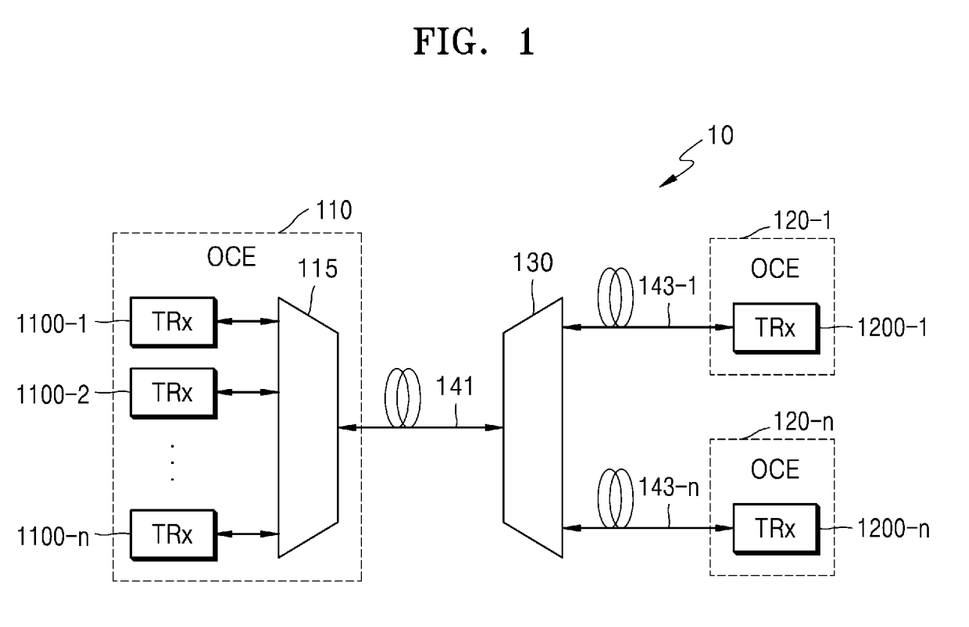
FIG. 1 is a schematic view of an optical communication system according to an embodiment.
Figure 2:
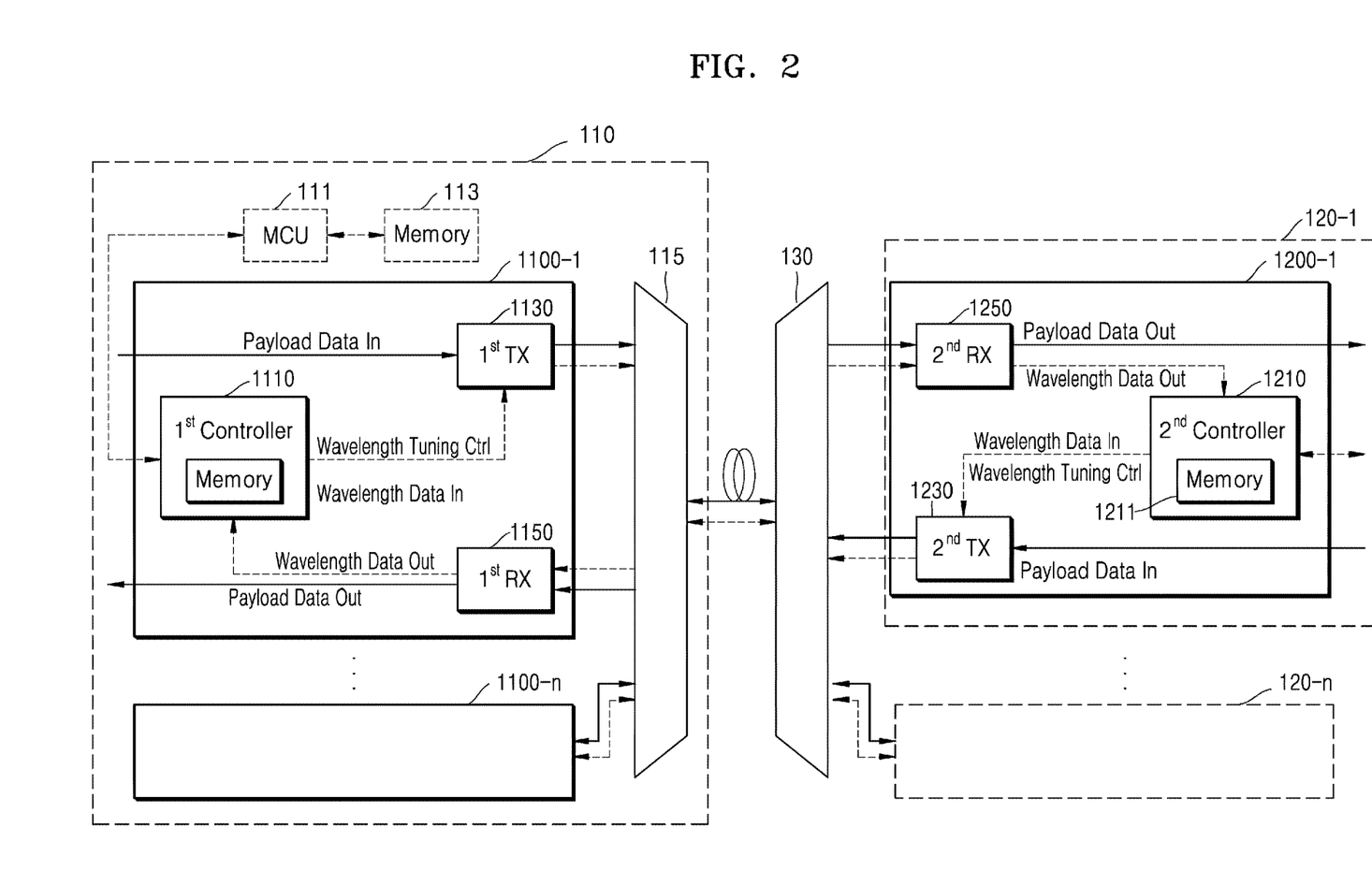
FIG. 2 is a block diagram illustrating in more detail a main portion of an optical transceiver in an optical communication system according to an embodiment.

FIG. 1 is a schematic view of an optical communication system according to an embodiment, and FIG. 2 is a block diagram illustrating in more detail a main portion of an optical transceiver in an optical communication system according to an embodiment.

Referring to FIG. 1, an optical communication system 10 according to an embodiment may include a first optical communication device 110 including n first optical transceivers 1100-1 to 1100-*n* (n is a natural number equal to or greater than 2), second optical communication devices 120-1 to 120-*n* each including at least one second optical transceiver, and a multiplexer/demultiplexer 130 (hereinafter referred to as MUX/DEMUX). The first optical communication device 110 and the MUX/DEMUX 130 may be connected to each other through an optical cable 141, and the second optical communication devices 120-1 to 120-*n* and the MUX/DEMUX 130 may be connected to each other through a corresponding one of optical cables 143-1 to 143-*n*. According to an embodiment, a plurality of sub-MUXes/DEMUXs may be connected to the MUX/DEMUX 130, and a tree topology may be formed in such a way that the second optical communication devices 120-1 to 120-*n* are connected to the sub-MUXs/DEMUXs.

In an embodiment, the optical communication system 100 may constitute an optical transport network, which is a sub-network constituting a fronthaul segment of a radio access network architecture. In this case, the optical communication device 110 may be a digital unit (DU) at a central office side or a termination device at a baseband unit (BBU) side. The second optical communication devices 120-1 to 120-n may be a remote unit (RU) or a remote radio head (RRH). The MUX/DEMUX 130 may be a remote node for dividing and combining optical signals transmitted and received between the first optical communication device 110 and the second optical communication devices 120-1 to 120-n. However, the disclosure is not limited thereto, and the inventive concept may be applied to midhaul and backhaul segments of the radio access network architecture.

In another embodiment, the optical communication system 10 may be applied to an optical subscriber network. In this case, the first optical communication device 110 may be an optical line terminal (OLT) at the central office side. The second optical communication devices 120-1 to 120-n may be any one of a remote terminal (RT), an optical network terminal (ONT) at a subscriber side, and an optical network unit. The MUX/DEMUX 130 may be a remote node for dividing and combining optical signals transmitted and received between the first optical communication device 110 and the second optical communication devices 120-1 to 120-n.

In another embodiment, the optical communication system 10 may be applied to a distributed antenna system (DAS) for solving a shadow area of a base station. In this case, the first optical communication device 120 may be a headend unit, and the second optical communication devices 120-1 to 120-n and/or the MUX/DEMUX 130 may be an extension unit or a remote unit.

As described above, the optical communication system 100 according to the inventive concept may be applied to various WDM-based optical communication networks composed of optical communication devices that are located remotely from each other and transmit and receive optical signals through corresponding optical transceivers.

Hereinafter, for convenience of description, an embodiment in which the first optical communication device 110 is a terminal device on the DU side and the second optical communication devices 120-1 to 120-n are RUs will be described on the premise that the optical communication system 10 configures the fronthaul segment of the radio access network architecture described above.

The first optical communication device 110 may generate in-band optical signals for use in transmitting high-speed data input from the DU side, multiplex the generated optical signals, and transmit them to the MUX/DEMUX 130 (based on downlink). Further, the first optical communication device 110 may receive optical signals transmitted from the second optical communication devices 120-1 to 120-n through the MUX/DEMUX 130, and may perform certain signal processing on the received optical signals and transmit the received optical signals to the DU side (based on uplink).

The first optical communication device 110 may include a main controller (MCU) 111, a memory 113, then first optical transceivers 1100-1 to 1100-n, and a MUX/DEMUX 115.

The MCU 111 may be a component that controls all operations of the first optical communication device 110. According to an embodiment, the MCU 111 may control a wavelength setting operation for a wavelength of then first optical transceivers 1100-1 to 1100-n described later below to transmit and receive an optical signal to and from second optical transceivers 1200-1 to 1200-n of the corresponding second optical communication devices 120-1 to 120-n.

The memory 113 may be connected to the MCU 111 and may store various types of information and program instructions necessary for the operation of the first optical communication device 110. For example, the memory 113 may store information about wavelengths of an optical signal allocated to the first optical communication device 110.

The first optical transceivers 1100-1 to 1100-n may be wavelength-tunable optical transceivers. Each of the first optical transceivers 1100-1 to 1100-n may perform an automatic wavelength setting operation of setting a transmission wavelength and a reception wavelength to perform optical communication with each of the second optical transceivers 1200-1 to 1200-n of the corresponding second optical communication devices 120-1 to 120-n. The first optical transceivers 1100-1 to 1100-n may transmit optical signals to the MUX/DEMUX 115 using wavelengths determined as a result of the automatic wavelength setting operation, or receive optical signals of corresponding wavelength bands from the MUX/DEMUX 115, respectively.

Each of the first optical transceivers 1100-1 to 1100-n may include a first controller 1110, a first transmitter 1130, and a first receiver 1150. Because functions and operations of the first optical transceivers 1100-1 to 1100-n are substantially the same, the first optical transceiver 1100-1 will be described as an example.

The first controller 1110 is configured to be connected to the MCU 111 by wire or wirelessly, and may manage and control the first optical transceiver 1100-1.

The first controller 1110 may manage control necessary for smooth transmission and reception of payload data between the first optical transceiver 1100-1 and a second optical transceiver corresponding thereto, for example, the second optical transceiver 1200-1 (control of wavelength setting, etc. or control of communication status monitoring, etc.) and transmission and reception of information necessary for this (hereinafter referred to as control management data).

For example, the first controller 1110 may control and manage wavelength tuning to control required for wavelength setting between the first optical transceiver 1100-1 and the second optical transceiver 1200-1 corresponding thereto, transmission and reception of tuned optical signals, and generation and transmission and reception of information related to wavelengths of the transmitted and received optical signals.

Here, the first controller 1110 may be a term collectively referring to a processor that performs various control and processing to transmit low-speed control management data as out-of-band optical signals through an auxiliary management and control channel along with high-speed payload data transmitted as in-band optical signals and/or a memory (e.g., 1111) in which firmware or the like is stored.

The first controller 1110 may transmit the control management data to the second optical transceiver 1200-1 according to various methods.

For example, the first controller 1110 may simultaneously transmit control management data and payload data to the second optical transceiver 1200-1 through baseband intensity over-modulation. For another example, the first controller 1110 may overlap the control management data and the payload data and transmit the same to the second optical transceiver 1200-1 through a radio frequency (RF) pilot tone method.

The baseband intensity over-modulation is a technology in which the control management data is stacked on top of the payload data, and the RF pilot tone method is a technology of superposing ASK or FSK modulated control management data with the payload data. A transmission rate of the control management data may be different from a transmission rate of the payload data. For example, a frequency of the control management data may be several kHz, and a frequency of the payload data may be tens to hundreds of MHz. A control management data transmission/reception method, such as the baseband intensity over-modulation and the RF pilot tone method, has already been disclosed, and thus detailed contents thereof are omitted.

The first transmitter 1130 is configured to convert input payload data and control management data into optical signals respectively and superpose them. The first transmitter 1130 may include transmitter optical sub-assemblies (TOSA) including a laser diode, a laser diode driving circuitry (LDD), a biasing circuitry, and the like. The payload data input to the first transmitter 1130 may be input through the LDD.

The first receiver 1150 may divide an optical signal input from the MUX/DEMUX 115 by demultiplexing into payload data and control management data and output them to corresponding configurations, respectively. In particular, the first receiver 1150 may output the control management data to the first controller 1110. The first receiver 1150 may include a receiver optical sub-assembly (ROSA) including a photo diode and a trans-impedance amplifier (TIA), a post amplifier, and the like.

The MUX/DEMUX 115 may multiplex optical signals output from the first transmitter 1130 of each of the first optical transceivers 1100-1 to 1100-$n$ and transmit them to an optical cable, and may demultiplex optical signals received by the optical cable. According to an embodiment, the MUX/DEMUX 115 may be a separate device separated from the first optical communication device 110.

N second optical communication devices 120-1 to 120-$n$ may receive optical signals transmitted through the MUX/DEMUX 130 from the first optical communication device 110, convert the received optical signals to electrical signals, and transmit the electrical signals to users of a cell site after certain signal processing (based on downlink). In addition, the second optical communication devices 120-1 to 120-$n$ may generate optical signals by electro-optically converting signals received from users, and transmit the generated optical signals to the MUX/DEMUX 130 (based on uplink).

Each of the second optical communication devices 120-1 to 120-$n$ may include a corresponding optical transceiver from among n second optical transceivers 1200-1 to 1200-$n$. The second optical communication devices 120-1 to 120-$n$ may further include components for performing the above-described signal processing in addition to the optical transceiver, and detailed descriptions will not be given herein for convenience of description.

Each of the second optical transceivers 1200-1 to 1200-$n$ may include a second controller 1210, a second transmitter 1230, and a second receiver 1250. Because functions and operations of the second optical transceivers 1200-1 to 1200-$n$ are substantially the same, the second optical transceiver 1200-1 will be described as an example.

The second controller 1210 may be a component that controls all operations of the second optical transceiver 1200-1.

The second controller 1210, similar to the first controller 1110 described above, may manage control necessary for smooth transmission and reception of payload data between the second optical transceiver 1200-1 and the first optical transceiver 1100-1 corresponding thereto (control of wavelength setting, etc. or control of communication status monitoring, etc.) and transmission and reception of information necessary for this (hereinafter referred to as control management data).

For example, the second controller 1210 may control and manage wavelength tuning control required for wavelength setting between the second optical transceiver 1200-1 and the first optical transceiver 1100-1 corresponding thereto, transmission and reception of tuned optical signals, and generation and transmission of information related to wavelengths of the transmitted and received optical signals.

Here, the second controller 1210 may be a term collectively referring to a processor that performs various control and processing to transmit low-speed control management data as out-of-band optical signals through an auxiliary management and control channel along with high-speed payload data transmitted as in-band optical signals, and/or a memory (e.g., 1211) in which firmware or the like is stored.

The second transmitter 1230 may be configured to correspond to the first transmitter 1130, and the second receiver 1250 may be configured to correspond to the first receiver 1150.

Optical signals corresponding to payload data and control management data may be generated and multiplexed through the second transmitter 1230 and the MUX/DEMUX 130 and transmitted to the first optical transceiver 1100-1. An optical signal received from the first optical transceiver 1100-1 through the MUX/DEMUX 130 and the second receiver 1250 may be demultiplexed and converted into an electrical signal.

In the above, the configuration of each of the first and second optical transceivers and all functions of each component have been described. Hereinafter, an operation of automatically setting a wavelength between a first optical transceiver and a second optical transceiver corresponding to each other in the optical communication system 10 will be described in detail with reference to FIGS. 3 and 4.

Figure 3:
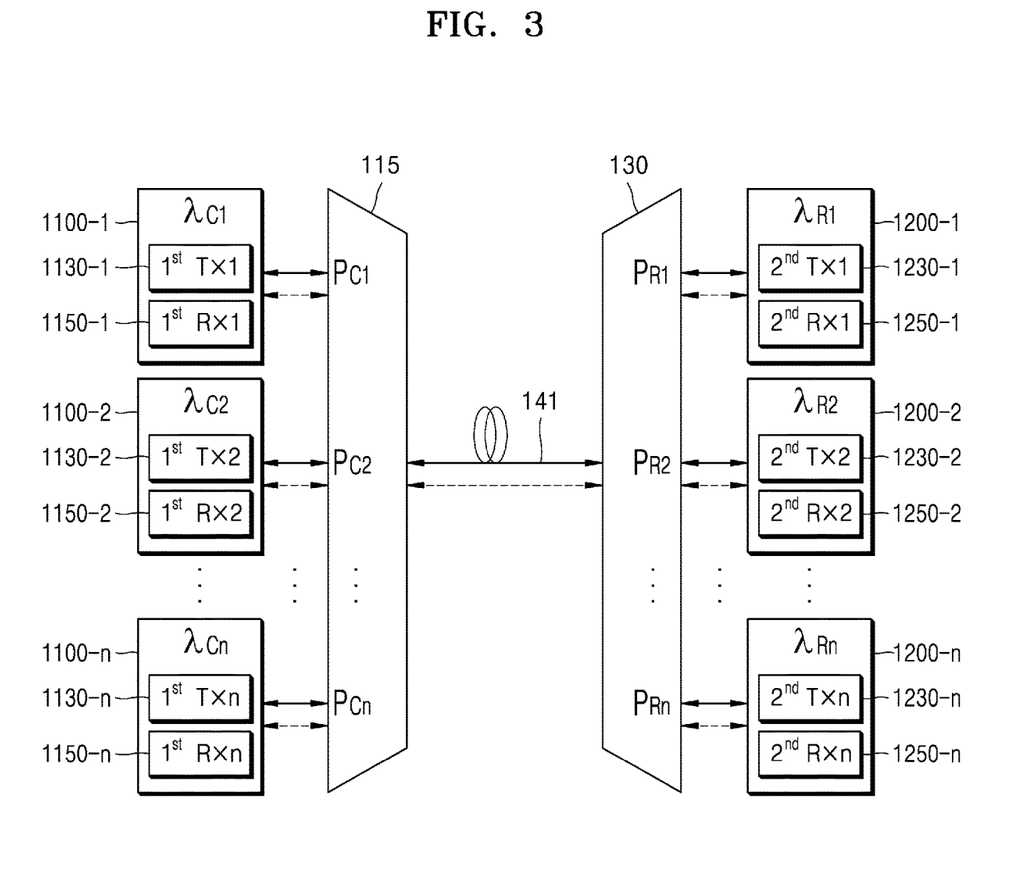
FIG. 3 is a view of an exemplary optical communication system to explain a method of automatically setting a wavelength of an optical transceiver according to an embodiment.
Figure 4:
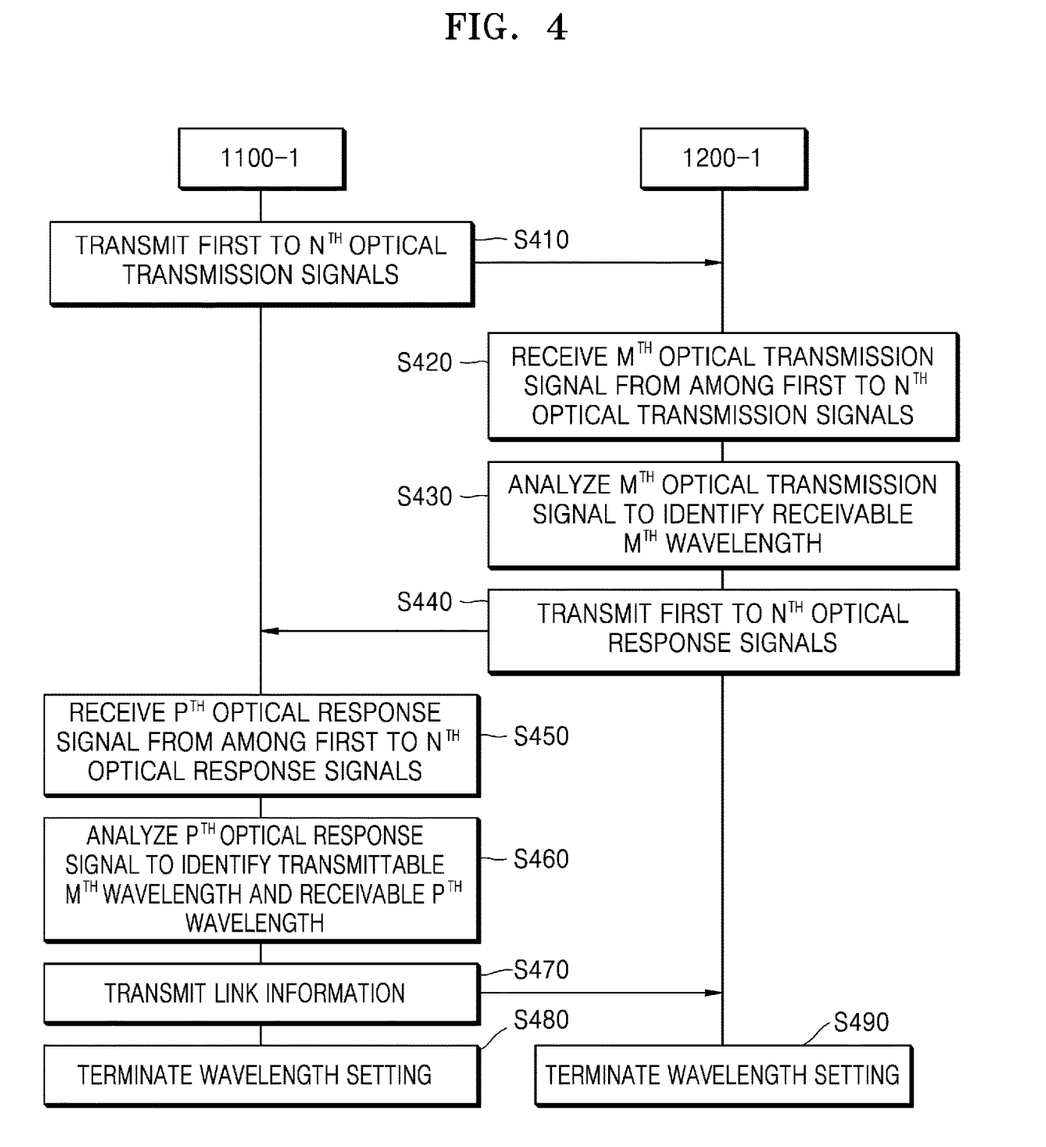
FIG. 4 is a flowchart of a method of automatically setting a wavelength of an exemplary optical transceiver.

FIG. 3 is a view of an exemplary optical communication system to explain a method of automatically setting a wavelength of an optical transceiver according to an embodiment, and FIG. 4 is a flowchart of a method of automatically setting a wavelength of an exemplary optical transceiver. FIG. 3 schematically shows the optical communication system 10 shown in FIG. 1 centering on optical transceivers and MUXs/DEMUXs, and FIG. 4 is a flowchart illustrating an operation of a method of automatically setting a wavelength between the first optical transceiver 1100-1 and the second optical transceiver 1200-1 of FIG. 3.

First, referring to FIG. 3, the n first optical transceivers 1100-1 to 1100-$n$ may be connected to the MUX/DEMUX 115, the n second optical transceivers 1200-1 to 1200-$n$ may be connected to the MUX/DEMUX 130, and the MUXs/DEMUXs 115 and 130 may be connected to each other through the optical cable 141.

The first and second optical transceivers 1100-1 to 1100-$n$ and 1200-1 to 1200-$n$ may be wavelength-tunable optical transceivers. Accordingly, the first and second optical transceivers 1100-1 to 1100-$n$ and 1200-1 to 1200-$n$ may generate an optical signal by changing a wavelength according to a preset method.

For example, the first optical transceivers 1100-1 to 1100-$n$, according to wavelengths allocated to the first optical communication device 110 on which the first optical transceiver 1100-1 to 1100-$n$ is mounted, may generate optical signals having first to $n^{th}$ wavelengths while changing the wavelengths to the first to $n^{th}$ wavelengths under the control of the first controller 1110.

Likewise, the second optical transceivers 1200-1 to 1200-n, according to wavelengths allocated to the second optical communication devices 120-1 to 120-n on which the second optical transceivers 1200-1 to 1200-n are respectively mounted, may generate optical signals having first to $n^{th}$ wavelengths while changing the wavelengths to the first to $n^{th}$ wavelengths under the control of the second controller 1210.

The first optical transceivers 1100-1 to 1100-n may be connected to an arbitrary port of the MUX/DEMUX 115. In FIG. 3, a case in which the first optical transceiver 1100-1 is connected to a first port Pc1, the first optical transceiver 1100-2 is connected to a second port Pc2, and the first optical transceiver 1100-n is connected to an $n^{th}$ port Pcn is illustrated.

The second optical transceivers 1200-1 to 1200-n may be connected to an arbitrary port of the MUX/DEMUX 130. In FIG. 3, a case in which the second optical transceiver 1200-1 is connected to a first port PR1, the second optical transceiver 1200-2 is connected to a second port PR2, and the second optical transceiver 1200-n is connected to an $n^{th}$ port PRn is illustrated.

Meanwhile, the MUX/DEMUX 115 may be set to transmit only an optical signal having a preset wavelength through each port through an optical cable. For example, the first port Pc1 may be preset to transmit only an optical signal having a first wavelength. In this case, all wavelengths preset in the second port Pc2 to the $n^{th}$ port Pcn may be different. This is the same in the case of the MUX/DEMUX 130.

Accordingly, corresponding optical transceivers from among the first and second optical transceivers 1100-1 to 1100-n and 1200-1 to 1200-n connected to the MUXs/DEMUXs 115 and 130 need to set their wavelengths to communicate with each other using an optical signal of a wavelength filtered and output from a port to which they are connected.

To this end, the first and second optical transceivers 1100-1 to 1100-n and 1200-1 to 1200-n according to an embodiment may perform an automatic wavelength setting operation for automatically recognizing and setting an optical signal having a wavelength corresponding to an arbitrary port to which the first and second optical transceivers 1100-1 to 1100-n and 1200-1 to 1200-n are connected.

The automatic wavelength setting operation will be described in more detail with reference to FIG. 4.

The operations to be described later below may be operations performed in any one of the first optical transceivers 1100-1 to 1100-n and any one of the second optical transceivers 1200-1 to 1200-n. The two optical transceivers performing the operations may be optical transceivers capable of transmitting and receiving optical signals to each other by forming an optical link connection. Hereinafter, it is assumed that the first optical transceiver 1100-1 and the second optical transceiver 1200-1 interlock with each other to form an optical link connection.

Referring to FIG. 4, in operation S410, the first optical transceiver 1100-1 may generate first to $n^{th}$ optical transmission signals having first to $n^{th}$ wavelengths and output them to the MUX/DEMUX 115. Here, the first to $n^{th}$ optical transmission signals may include transmission wavelength information about each wavelength (i.e., a corresponding wavelength from among the first to $n^{th}$ wavelengths).

The first to $n^{th}$ wavelengths and transmission wavelength information corresponding thereto may be preset to perform an automatic wavelength setting operation, and setting values may be stored in the memory 1111 of the first controller 1110. However, the disclosure is not limited thereto, and the setting values may be transmitted from the MCU 111 of the first optical communication device 110, an external management server (not shown), a local terminal, or the like to the first controller 1110 through the MCU 111.

The transmission wavelength information is information about a length of a corresponding wavelength, and may be information generated as control management data by the first controller 1110. For example, for a first optical transmission signal having a first wavelength, the first controller 1110 may generate information about a length of the first wavelength as control management data.

The first transmitter 1130 may sequentially generate optical signals having first to $n^{th}$ wavelengths (test optical signals), may generate an optical signal (control management optical signal) corresponding to transmission wavelength information indicating each of the first to $n^{th}$ wavelengths under control of the first controller 1110, may generate optical transmission signals by superposing a test optical signal and a control management optical signal corresponding to each other, and may output the generated optical transmission signals to the MUX/DEMUX 115.

In operation S420, the second optical transceiver 1200-1 may receive only the $m^{th}$ optical transmission signal from among the first to $n^{th}$ optical transmission signals through the MUX/DEMUX 115, the optical cable 141, and the MUX/DEMUX 130.

As described above, because each port of the MUX/DEMUX 115 performs the function of a band pass filter (BPF) so that only optical signals of a preset wavelength may be output, one of the first to $n^{th}$ optical transmission signals, for example, only the $m^{th}$ optical transmission signal (m is a natural number equal to or less than n) may be transmitted to the second optical transceiver 1200-1 through the optical cable 141 and the MUX/DEMUX 130 by the first port Pc1 to which the first optical transceiver 1100-1 is connected.

In operation S430, the second receiver 1250 of the second optical transceiver 1200-1 may output $m^{th}$ transmission wavelength information included in the $m^{th}$ optical transmission signal to the second controller 1210, and the second controller 1210 may analyze the $m^{th}$ transmission wavelength information to identify that a wavelength that the second optical transceiver 1200-1 may receive from the first optical transceiver 1100-1 is the $m^{th}$ wavelength.

In operation S440, the second optical transceiver 1200-1 may generate first to $n^{th}$ optical response signals having first to $n^{th}$ wavelengths in response to the $m^{th}$ optical transmission signal and output them to the MUX/DEMUX 130. Here, the first to $n^{th}$ optical response signals may include transmission wavelength information for each wavelength (i.e., a corresponding wavelength from among the first to $n^{th}$ wavelengths). In addition, the first to $n^{th}$ optical response signals may include information about a reception wavelength of the second optical transceiver 1200-1 identified in operation S430 (e.g., the $m^{th}$ wavelength).

The first to $n^{th}$ wavelengths and the transmission wavelength information corresponding thereto may be preset to perform an automatic wavelength setting operation, and setting values may be stored in the memory 1211 of the second controller 1210. However, the disclosure is not limited thereto, and the setting values may be transmitted through the first optical transceiver 1100-1, or may be transmitted from a main controller (not shown) of the second optical communication device 120 or a local terminal to the second controller 1210 through the MCU 111.

The transmission wavelength information is information about a length of a corresponding wavelength, and may be information generated as control management data by the second controller 1210. For example, for a first optical response signal having a first wavelength, the second controller 1210 may generate information about a length of the first wavelength as control management data.

In addition, the reception wavelength information is information about a length of a corresponding reception wavelength, and may be information generated as control management data by the second controller 1210. For example, when the reception wavelength is an $m^{th}$ wavelength, the second controller 1210 may generate information about a length of a second wavelength as control management data.

The second transmitter 1230 may sequentially generate optical signals having first to $n^{th}$ wavelengths (test response signals), may generate an optical signal (control management optical signal) corresponding to transmission wavelength information and/or reception wavelength information indicating each of the first to $n^{th}$ wavelengths under control of the second controller 1210, may generate optical response signals by superposing a test response signal and a control management optical signal corresponding to each other, and may output the generated optical response signals to the MUX/DEMUX 130.

In operation S450, the first optical transceiver 1100-1 may receive only $p^{th}$ optical response signal from among the first to $n^{th}$ optical response signals through the MUX/DEMUX 130, the optical cable 141, and the MUX/DEMUX 115.

Because each port of the MUX/DEMUX 115 performs the function of a BPF so that only optical signals of a preset wavelength may be output, one of the first to $n^{th}$ optical response signals, for example, only the $p^{th}$ optical response signal (p is a natural number equal to or less than n) may be transmitted to the first optical transceiver 1100-1 through the optical cable 141 and the MUX/DEMUX 115 by the first port PR1 to which the second optical transceiver 1200-1 is connected.

In operation S460, the first receiver 1150 of the first optical transceiver 1100-1 may output $p^{th}$ transmission wavelength information and reception wavelength information included in the $p^{th}$ optical response signal to the first controller 1110, and the first controller 1110 may analyze the $p^{th}$ transmission wavelength information and reception wavelength information to identify that a wavelength that the first optical transceiver 1100-1 may receive from the second optical transceiver 1200-1 is a $p^{th}$ wavelength and a wavelength that the first optical transceiver 1100-1 may transmit to the second optical transceiver 1200-1 is the $m^{th}$ wavelength.

In operation S470, the first controller 1110 may generate optical link information between the first optical transceiver 1100-1 and the second optical transceiver 1200-1 including information about the identified transmittable wavelength and receivable wavelength (i.e., the $m^{th}$ wavelength and the $p^{th}$ wavelength), and the first controller 1110 and the first transmitter 1130 may generate an out-of-band optical signal corresponding to the generated optical link information (as control management data) and transmit the out-of-band optical signal to the second optical transceiver 1200-1 through the MUX/DEMUX 115, the optical cable 141, and the MUX/DEMUX 130.

The second optical transceiver 1200-1 may also analyze the out-of-band optical signal corresponding to the optical link information to recognize the identified transmittable wavelength and the receivable wavelength (i.e., the $m^{th}$ wavelength and the $p^{th}$ wavelength) between the first optical transceiver 1100-1.

In operations S480 and S490, a wavelength setting operation is terminated by the first and second optical transceivers 1100-1 and 1200-1 setting transmission and reception wavelengths for mutual optical communication based on the identified $m^{th}$ and $p^{th}$ wavelengths, and in-band optical signals for high-speed payload data may be transmitted and received between the first and second optical transceivers 1100-1 and 1200-1 through the set wavelengths.

Through this operation, the first optical transceiver 1100-1 and the second optical transceiver 1200-1 may perform optical communication by automatically recognizing and setting wavelengths that can be transmitted/received to each other.

As described above, in the optical communication system 10 according to an embodiment, wavelength-tunable optical transceivers corresponding to each other at a transmitting side and a receiving side may automatically perform a wavelength setting operation for optical communication without direct adjustment such as an administrator's visit. Accordingly, it is possible to reduce costs as well as improve the convenience of installation, maintenance, and management.

In addition, the optical transceivers are versatile because there is no compatibility issue with an optical communication device to which the optical transceivers are applied, and the wavelength-tunable optical transceivers on both sides may have substantially the same components, so that the cost of building a system may be greatly reduced.

While the embodiments have been particularly shown and described, it will be understood by one of ordinary skill in the art that various changes in form and details may be made therein without departing from the spirit and scope of the disclosure as defined by the appended claims.

The invention claimed is:

1. An optical transceiver comprising:
    an optical transmitter configured to sequentially generate a plurality of optical transmission signals each including transmission wavelength information and output the plurality of optical transmission signals to a connected multiplexer/demultiplexer; and
    a controller configured to generate the transmission wavelength information for each of the plurality of optical transmission signals,
    wherein one of the plurality of optical transmission signals is transmitted to another optical transceiver through the multiplexer/demultiplexer,
    wherein the optical transceiver further comprises an optical receiver configured to receive through the multiplexer/demultiplexer an optical response signal that is transmitted from the another optical transceiver in response to the one of the plurality of optical transmission signals and includes reception wavelength information on a wavelength of the optical response signal and transmission wavelength information on a wavelength of the one of the plurality of optical transmission signals, and
    wherein the controller is configured to identify a transmission wavelength and a reception wavelength for communication with the another optical transceiver based on the reception wavelength information and the transmission wavelength information included in the optical response signal.

2. The optical transceiver of claim 1, wherein the optical transceiver generates each of the plurality of optical transmission signals by superposing an optical signal corresponding to the transmission wavelength information and an optical signal having a wavelength indicated by the transmission wavelength information.

3. The optical transceiver of claim 2, wherein the optical signal corresponding to the transmission wavelength information and the optical signal having a wavelength indicated by the transmission wavelength information are optical signals of different channels.

4. The optical transceiver of claim 3, wherein a channel of the optical signal corresponding to the transmission wavelength information is an auxiliary management and control channel (AMCC).

5. The optical transceiver of claim 1, wherein the controller generates link information with the another optical transceiver based on the identified transmission wavelength and the reception wavelength, and
the optical transmitter generates an optical signal corresponding to the link information and outputs the generated optical signal to the multiplexer/demultiplexer.

6. An optical transceiver comprising:
an optical receiver receiving an optical transmission signal that is transmitted from another optical transceiver and including transmission wavelength information through a connected multiplexer/demultiplexer;
a controller configured to identify a reception wavelength for communication with the another optical transceiver based on the transmission wavelength information included in the optical transmission signal; and
an optical transmitter configured to sequentially generate a plurality of optical response signals each including transmission wavelength information and reception wavelength information about the identified reception wavelength in response to the optical transmission signal and output the plurality of optical response signals to the multiplexer/demultiplexer,
wherein the controller generates the transmission wavelength information and the reception wavelength information for each of the plurality of optical response signals, and
wherein one of the plurality of optical response signals is transmitted to the another optical transceiver through the multiplexer/demultiplexer.

7. The optical transceiver of claim 6, wherein the optical transmitter generates each of the plurality of optical response signals by superposing an optical signal corresponding to the transmission wavelength information and the reception wavelength information and an optical signal having a wavelength indicated by the transmission wavelength information.

8. The optical transceiver of claim 7, wherein the optical signal corresponding to the transmission wavelength information and the reception wavelength information and the optical signal having a wavelength indicated by the transmission wavelength information are optical signals of different channels.

9. The optical transceiver of claim 8, wherein a channel of the optical signal corresponding to the transmission wavelength information and the reception wavelength information is an auxiliary management and control channel (AMCC).

10. The optical transceiver of claim 6, wherein the one of the plurality of optical response signals is transmitted to the another optical transceiver through the multiplexer/demultiplexer.

11. The optical transceiver of claim 10, wherein the optical receiver receives an optical signal that is transmitted from the another optical transceiver in response to the one of the plurality of optical response signals through the multiplexer/demultiplexer and corresponding to optical link information, and
the controller identifies a transmission wavelength for communication with the another optical transceiver based on the link information included in the optical signal.

* * * * *